US011840395B2

(12) United States Patent
Krajewski et al.

(10) Patent No.: US 11,840,395 B2
(45) Date of Patent: Dec. 12, 2023

(54) INFLATABLE INSULATION PANEL AND VEHICLE INCLUDING INFLATABLE INSULATION PANELS THAT DEFINE A CARGO AREA OF THE VEHICLE

(71) Applicant: GM GLOBAL TECHNOLOGY OPERATIONS LLC, Detroit, MI (US)

(72) Inventors: Paul E. Krajewski, Troy, MI (US); Taeyoung Han, Bloomfield Hills, MI (US); Wonhee M. Kim, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 102 days.

(21) Appl. No.: 17/142,364

(22) Filed: Jan. 6, 2021

(65) Prior Publication Data

US 2022/0212858 A1 Jul. 7, 2022

(51) Int. Cl.
*A47C 27/08* (2006.01)
*B65D 81/38* (2006.01)
*B60R 13/08* (2006.01)
*B62D 25/06* (2006.01)
*B62D 25/20* (2006.01)
*A45C 11/20* (2006.01)

(52) U.S. Cl.
CPC .......... *B65D 81/3893* (2013.01); *A45C 11/20* (2013.01); *B60R 13/08* (2013.01); *B62D 25/06* (2013.01); *B62D 25/2036* (2013.01); *B65D 81/3897* (2013.01)

(58) Field of Classification Search
CPC .. A47C 27/087; A47C 27/081; B65D 81/052; B65D 81/3893

USPC ......................... 5/706, 712, 710, 711; 383/3
See application file for complete search history.

(56) References Cited

U.S. PATENT DOCUMENTS 4,371,999 A * 2/1983 Reid ..................... A47C 27/081
5/711
5,608,931 A * 3/1997 Gancy .................. A47C 27/087
5/711

(Continued)

FOREIGN PATENT DOCUMENTS

DE 202018000567 U1 * 9/2018

OTHER PUBLICATIONS

DE202018000567Translation (Year: 2018).*

(Continued)

*Primary Examiner* — Jes F Pascua
*Assistant Examiner* — Nina K Attel (57) ABSTRACT

An inflatable insulation panel includes a bladder configured to contain air, plurality of tethers disposed within an interior cavity of the bladder, and at least one reflective film disposed within the interior cavity of the bladder. The bladder includes a first wall, a second wall opposite of the first wall, and perimeter walls extending between and connected to perimeter edges of the first and second walls. The first and second walls and the perimeter walls collectively defining the interior cavity of the bladder. The plurality of tethers extend between and are connected to interior surfaces of the first and second walls. The plurality of tethers limit movement of the first and second walls away from one another when the bladder is inflated. The at least one reflective film is disposed between the interior surfaces of the first and second walls.

20 Claims, 6 Drawing Sheets

(56) References Cited

U.S. PATENT DOCUMENTS

| | | | |
|---|---|---|---|
| 10,687,634 B1 | 6/2020 | Kim et al. | |
| 10,799,002 B2 | 10/2020 | Bradley | |
| 2017/0119116 A1* | 5/2017 | Bradley | A45C 13/103 |
| 2019/0301767 A1 | 10/2019 | Alexander et al. | |
| 2020/0139877 A1 | 5/2020 | Alexander et al. | |
| 2020/0223340 A1 | 7/2020 | Nasca et al. | |

OTHER PUBLICATIONS

U.S. Appl. No. 16/669,827, filed Oct. 31, 2019, Chae et al.
U.S. Appl. No. 16/940,541, filed Jul. 28, 2020, Krajewski et al.
U.S. Appl. No. 17/084,796, filed Oct. 30, 2020, Alexander et al.
U.S. Appl. No. 17/103,698, filed Nov. 24, 2020, Chae et al.
U.S. Appl. No. 17/103,721, filed Nov. 24, 2020, Chae et al.

* cited by examiner

INFLATABLE INSULATION PANEL AND VEHICLE INCLUDING INFLATABLE INSULATION PANELS THAT DEFINE A CARGO AREA OF THE VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to inflatable insulation panels and vehicles including inflatable insulation panels that define a cargo area.

A delivery truck used for delivering items that must be kept at cold temperatures typically includes insulation panels surrounding the cargo area of truck. The insulation panels in a delivery truck are typically made from fiber reinforced plastic (FRP). One example of such a delivery truck includes a frame, a passenger compartment mounted to the frame near the front end thereof, and storage compartment mounted to the frame near the rear end thereof. The storage compartment includes a roof, a floor, and a pair of sidewalls disposed on opposite sides of the roof and the floor. The roof, the floor, and the sidewalls enclose the cargo area of the truck. Each of the roof, the floor, and the sidewalls includes an insulation panel made from FRP and a bracket securing the insulation panel.

SUMMARY

An example of an inflatable insulation panel according to the present disclosure includes a bladder configured to contain air, plurality of tethers disposed within an interior cavity of the bladder, and at least one reflective film disposed within the interior cavity of the bladder. The bladder includes a first wall, a second wall opposite of the first wall, and perimeter walls extending between and connected to perimeter edges of the first and second walls. The first and second walls and the perimeter walls collectively defining the interior cavity of the bladder. The plurality of tethers extend between and are connected to interior surfaces of the first and second walls. The plurality of tethers limit movement of the first and second walls away from one another when the bladder is inflated. The at least one reflective film is disposed between the interior surfaces of the first and second walls.

In one aspect, the at least one reflective film is attached to at least one of the interior surfaces of the first and second walls.

In one aspect, the at least one reflective film includes a first reflective film attached to the interior surface of the first wall and a second reflective film attached to the interior surface of the second wall.

In one aspect, the at least one reflective film is spaced apart from the interior surfaces of the first and second walls when the bladder is inflated.

In one aspect, the at least one reflective film has an emissivity that is less than or equal to 0.5.

In one aspect, the inflatable insulation panel further includes a plurality of flexible layers disposed within the interior cavity of the bladder. The plurality of flexible layers extend between and are connected to the interior surfaces of the first and second walls. The plurality of flexible layers divide the interior cavity of the bladder into a plurality of cells.

In one aspect, the plurality of flexible layers are attached to the at least one reflective film.

In one aspect, the plurality of flexible layers extend through the at least one reflective film and are attached to the interior surfaces of the first and second walls.

A cooler according to the present disclosure includes a bottom wall, a top wall, and sidewalls extending between and connected to perimeter edges of the top and bottom walls. At least one of the bottom wall, the top wall, and the sidewalls is at least partially formed by the inflatable insulation panel.

Another inflatable insulation panel according to the present disclosure includes a bladder configured to contain air, a plurality of tethers disposed within an interior cavity of the bladder, and a plurality of flexible layers disposed within the interior cavity of the bladder. The bladder includes a first wall, a second wall opposite of the first wall, and perimeter walls extending between and connected to perimeter edges of the first and second walls. The first and second walls and the perimeter walls collectively define the interior cavity of the bladder. The plurality of tethers extend between and are connected to interior surfaces of the first and second walls. The plurality of tethers limit movement of the first and second walls away from one another when the bladder is inflated. The plurality of flexible layers also extend between and are connected to the interior surfaces of the first and second walls. The plurality of flexible layers divide the interior cavity of the bladder into a plurality of cells.

In one aspect, the plurality of flexible layers are configured to prevent airflow between the plurality of cells.

In one aspect, the plurality of flexible layers extend between and are connected to interior surfaces of two of the perimeter walls that oppose one another.

In one aspect, the first and second walls are spaced apart from one another by a distance that is greater than or equal to 0.02 meters when the bladder is inflated.

A vehicle according to the present disclosure includes a roof, a floor, a first vertical wall, and a second vertical wall that collectively define a cargo area of the vehicle. The roof includes a first bladder and a first plurality of tethers disposed within an interior cavity of the first bladder. The first bladder includes a top wall, a bottom wall opposite of the top wall, and sidewalls extending between and connected to perimeter edges of the top and bottom walls. The top and bottom walls and the sidewalls collectively defining the interior cavity of the first bladder. The first plurality of tethers extend between and are connected to interior surfaces of the top and bottom walls. The floor includes a second bladder and a second plurality of tethers disposed within an interior cavity of the second bladder. The second bladder includes a top wall, a bottom wall opposite of the top wall, and sidewalls extending between and connected to perimeter edges of the top and bottom walls of the second bladder. The top and bottom walls of the second bladder and the sidewalls of the second bladder collectively defining the interior cavity of the second bladder. The second plurality of tethers extend between and are connected to interior surfaces of the top and bottom walls of the second bladder. The first vertical wall includes a third bladder and a third plurality of tethers disposed within an interior cavity of the third bladder. The third bladder includes a top wall, a bottom wall opposite of the top wall, and sidewalls extending between and connected to perimeter edges of the top and bottom walls of the third bladder. The top and bottom walls of the third bladder and the sidewalls of the third bladder collectively defining the interior cavity of the third bladder. The third plurality of tethers extend between and are connected to interior surfaces of the sidewalls of the third bladder. The second vertical wall includes a fourth bladder and a fourth plurality of tethers disposed within an interior cavity of the fourth bladder. The fourth bladder includes a top wall, a bottom wall opposite of the top wall, and sidewalls extending between and connected to perimeter edges of the top and bottom walls of the fourth bladder. The top and bottom walls of the fourth bladder and the sidewalls of the fourth bladder collectively defining the interior cavity of the fourth bladder. The fourth plurality of tethers extend between and are connected to interior surfaces of the sidewalls of the fourth bladder.

In one aspect, the roof is disposed above the floor, the first vertical wall abuts a first side of the roof and a first side of the floor, and the second vertical wall abuts a second side of the roof opposite of the first side of the roof and a second side of the floor opposite of the first side of the floor.

In one aspect, the first, second, third, and fourth bladders are configured to be deflated to increase a volume of the cargo area.

In one aspect, the roof further includes a first reflective film disposed within the interior cavity of the first bladder and between the interior surfaces of the top and bottom walls of the first bladder, the floor further includes a second reflective film disposed within the interior cavity of the second bladder and between the interior surfaces of the top and bottom walls of the second bladder, the first vertical wall further includes a third reflective film disposed within the interior cavity of the third bladder and between the interior surfaces of the sidewalls of the third bladder, and the second vertical wall further includes a fourth reflective film disposed within the interior cavity of the fourth bladder and between the interior surfaces of the sidewalls of the fourth bladder.

In one aspect, the first reflective film is configured to prevent radiation between the interior surfaces of the top and bottom walls of the first bladder, the second reflective film is configured to prevent radiation between the interior surfaces of the top and bottom walls of the second bladder, the third reflective film is configured to prevent radiation between the interior surfaces of the top and bottom walls of the third bladder, and the fourth reflective film is configured to prevent radiation between the interior surfaces of the top and bottom walls of the fourth bladder.

In one aspect, the roof further includes a first plurality of flexible layers disposed within the interior cavity of the first bladder, the floor further includes a second plurality of flexible layers disposed within the interior cavity of the second bladder, the first vertical wall further includes a third plurality of flexible layers disposed within the interior cavity of the third bladder, and the second vertical wall further includes a fourth plurality of flexible layers disposed within the interior cavity of the fourth bladder. The first plurality of flexible layers extends between and are connected to the interior surfaces of the top and bottom walls. The first plurality of flexible layers divide the interior cavity of the first bladder into a plurality of cells. The second plurality of flexible layers extend between and are connected to the interior surfaces of the top and bottom walls. The second plurality of flexible layers divide the interior cavity of the second bladder into a plurality of cells. The third plurality of flexible layers extend between and are connected to the interior surfaces of the sidewalls of the third bladder. The third plurality of flexible layers divide the interior cavity of the third bladder into a plurality of cells. The fourth plurality of flexible layers extend between and are connected to the interior surfaces of the sidewalls of the fourth bladder. The fourth plurality of flexible layers divide the interior cavity of the fourth bladder into a plurality of cells.

In one aspect, the first plurality of flexible layers are configured to prevent airflow between the plurality of cells in the first bladder, the second plurality of flexible layers are configured to prevent airflow between the plurality of cells in the second bladder, the third plurality of flexible layers are configured to prevent airflow between the plurality of cells in the third bladder, and the fourth plurality of flexible layers are configured to prevent airflow between the plurality of cells in the fourth bladder.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

As discussed above, insulation panels used in delivery trucks are typically made from FRP. In addition, the insulation panels are relatively thick to ensure that the insulation panels provide the desired amount of insulation. Since the insulation panels typically surround the cargo area of the delivery truck, increasing the thickness of the insulation panels typically decreases the volume of the cargo area. In addition, insulation panels made from FRP are relatively heavy, which may make them impractical for use in an electric delivery truck with a limited payload.

An insulation panel according to the present disclosure includes a bladder configured to be inflated with air and internal tethers that limit the expansion of the bladder. The tethers also increase the rigidity of the insulation panel, and ensure that the insulation panel forms a desired shape when inflated, such as a rectangular cuboid. In one example, the insulation panel further includes fabric layers that divide the internal cavity of the bladder into multiple cells and prevent airflow between the cells to inhibit convention in the internal cavity. In another example, the insulation panel includes a reflective film disposed in the internal cavity of the bladder between opposing walls of the bladder to inhibit radiation between the walls.

An insulation panel according to the present disclosure allows less heat loss per unit area relative to an insulation panel made from FRP. Thus, an insulation panel according to the present disclosure may be thinner than an insulation panel made from FRP while providing the same insulation performance as the insulation panel made from FRP. As a result, a delivery truck that includes insulation panels according to the present disclosure in place of insulation panels made from FRP may have a larger cargo area than other delivery trucks. In addition, an insulation panel according to the present disclosure weighs much less than an insulation panel made from FRP even if both types of panels have the same thickness. Thus, an insulation panel according to the present disclosure is better suited for electric delivery trucks.

Although the insulation panels according to the present disclosure are primary discussed in the context of a vehicle, the insulation panels may be used in other applications. For example, the present disclosure also discusses using the insulation panels in a soft cooler.

Figure 1:
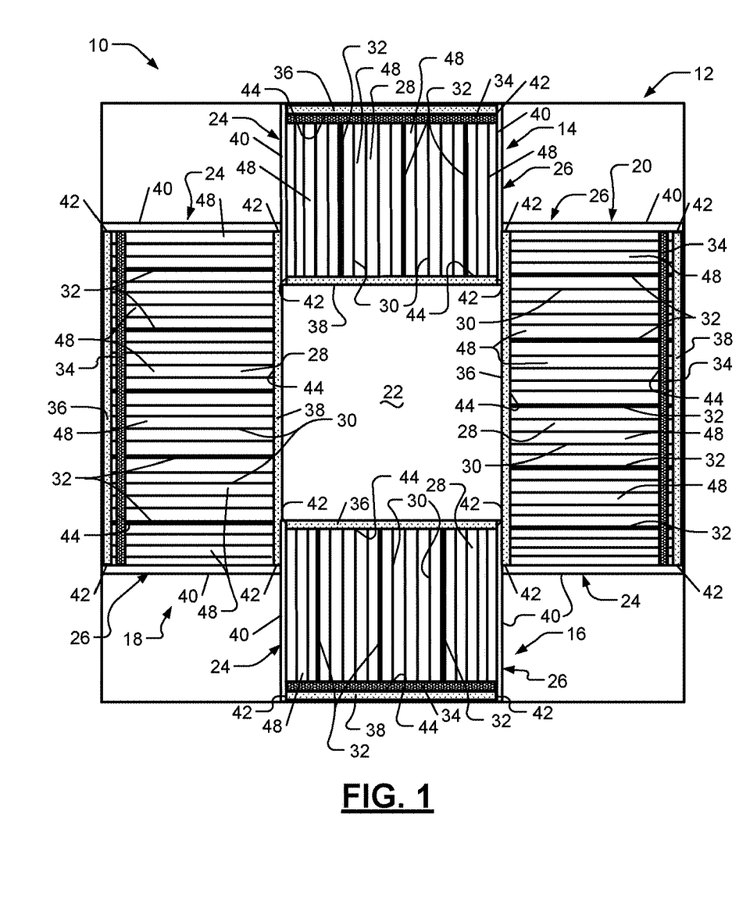
FIG. 1 is a section view of a first example of a vehicle including inflatable insulation panels according to the present disclosure.

Referring now to FIG. 1, a vehicle 10 includes a body structure 12, a roof 14, a floor 16, a first vertical wall 18, and a second vertical wall 20. The roof 14, a floor 16, the first vertical wall 18, and the second vertical wall 20 are secured to the body structure 12. The roof 14, a floor 16, the first vertical wall 18, and the second vertical wall 20 collectively define a cargo area 22 of the vehicle 10. In one example, the vehicle 10 is a delivery truck. Each of the roof 14, the floor 16, the first vertical wall 18, and the second vertical wall 20 is formed by an inflatable insulation panel 24.

Each panel 24 has a rectangular cuboid shape when inflated. Each panel 24 includes a bladder 26 having an interior cavity 28, a plurality of tethers 30 disposed within the interior cavity 28, a plurality of flexible layers 32 disposed within the interior cavity 28, and a reflective film 34 disposed within the interior cavity 28. Each bladder 26 can be inflated and deflated. In one example, each bladder 26 includes a valve (not shown) that regulates airflow into and out of the bladder 26. Each bladder 26 may be made from a thin layer of material such as thermoplastic polyurethane (TPU) or silicone coated flexible (e.g., nylon, polyester, Kevlar, etc.). The thickness of the each bladder 26 may vary from 0.1 millimeters (mm) to 10 mm depending on the pressure range of the bladder 26.

Each bladder 26 includes a first wall 36, a second wall 38 opposite of the first wall 36, and perimeter walls 40 extending between and connected to perimeter edges 42 of the first and second walls 36 and 38. The first and second walls 36 and 38 and the perimeter walls 40 collectively define and completely enclose the internal cavity 28 of the bladder 26. The first and second walls 36 and 38 may be spaced apart from one another by a distance that is greater than or equal to 0.02 meters (m) when the bladder 26 is inflated. For the roof 14 and the floor 16, the first wall 36 may be referred to as a top wall, the second wall 38 may be referred to as a bottom wall, and the perimeters walls 40 may be referred to as sidewalls. For the first and second vertical walls 18 and 20, the first and second walls 36 and 38 may be referred to as sidewalls, the upper perimeter wall 40 may be referred to as a top wall, and the lower perimeter wall 40 may be referred to as a bottom wall.

The tethers 30 extend between and are connected to interior surfaces 44 of the first and second walls 36 and 38. The tethers 30 limit movement of the first and second walls 36 and 38 away from one another when the bladder 26 is inflated. In addition, the tethers 30 increase the amount of compressive force that the bladder 26 may withstand in a direction extending along the lengths of the tethers 30 before the bladder 26 deforms in response to the compressive force.

The tethers 30 may be connected to the first and second walls 36 and 38 using three-dimensional (3D) knitting, weft knitting, hand stitching, an embroidering machine, a clothing tag installation device, and/or adhesive. The tethers 30 may include monofilament threads, such as wires, and/or multifilament threads, such as yarn. Additionally or alternatively, the tethers 30 may include cables and/or ribbons (or tapes). The tethers 30 may have cross-sectional shapes that are circular, star-shaped, and/or rectangular.

The flexible layers 32 also extend between and are connected to the interior surfaces 44 of the first and second walls 36 and 38. In addition, the flexible layers 32 extend between and are connected to interior surfaces 44 of the perimeter walls 40. The flexible layers 32 divide the interior cavity 28 of each bladder 26 into a plurality of cells 48. The flexible layers 32 prevent airflow between the cells 48 of each bladder 26 and thereby inhibit convection within the internal cavity 28 thereof.

The flexible layers 32 may be connected to the first and second walls 36 and 38 and the perimeter walls 40 using 3D knitting, weft knitting, hand stitching, an embroidering machine, a clothing tag installation device, and/or adhesive. The connections between the flexible layers 32 and the walls 36, 38, 40 may be air-tight (e.g., sealed). The flexible layers 32 may be made from a flexible material such as fabric and/or plastic. The flexible material may be air-impermeable.

The reflective film 34 is disposed between the interior surfaces 44 of the first and second walls 36 and 38 and prevents radiation between the interior surfaces 44. In the example shown, the reflective film 34 is parallel to the first and second walls 36 and 38. In the roof 14 and the first vertical wall 18, the reflective film 34 is attached to the interior surface 44 of the first wall 36. In the floor 16 and the second vertical wall 20, the reflective film 34 is attached to the interior surface 44 of the first wall 36. The reflective film 34 may be attached to the interior surfaces 44 of the first and second walls 36 and 38 using adhesive. The reflective film 34 may be made from aluminum foil and/or may have an emissivity that is less than or equal to 0.05.

The flexible layers 32 may extend through the reflective film 34 and be directly connected to the first and second walls 36 and 38. Additionally or alternatively, the flexible layers 32 may be directly connected to the reflective film 34 and thereby indirectly connected to the first or second wall 36 or 38 through the reflective film 34. In the roof 14, the flexible layers 32 are directly connected to the second wall 38 and are connected to the first wall 36 through the reflective film 34. In the floor 16, the flexible layers 32 are directly connected to the first wall 36 and are connected to the second wall 38 through the reflective film 34. In the first and second vertical walls 18 and 20, the flexible layers 32 extend through the reflective film 34 and are directly connected to the first and second walls 36 and 38.

Figure 2:
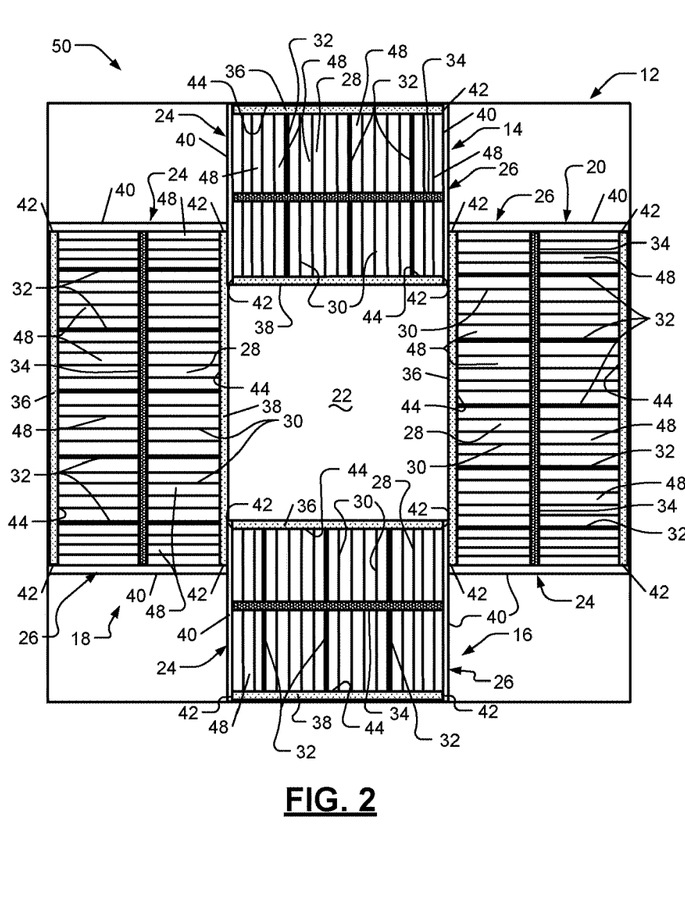
FIG. 2 is a section view of a second example of a vehicle including inflatable insulation panels according to the present disclosure.

Referring now to FIG. 2, a vehicle 50 is shown that is similar or identical to the vehicle 10 except for the position of the reflective film 34 and the connections between the flexible layers 32 and the first and second walls 36 and 38. In FIG. 2, the reflective film 34 is spaced apart from the interior surfaces 44 of the first and second walls 36 and 38 when the bladder 26 is inflated. In the example shown, the reflective film 34 is disposed approximately midway between the interior surfaces 44 of the first and second walls 36 and 38 when the bladder 26 is inflated. In addition, in the roof 14, the floor 16, the first vertical wall 18, and the second vertical wall 20, the tethers 30 and the flexible layers 32 extend through the reflective film 34 and are directly connected to the first and second walls 36 and 38.

Figure 3:
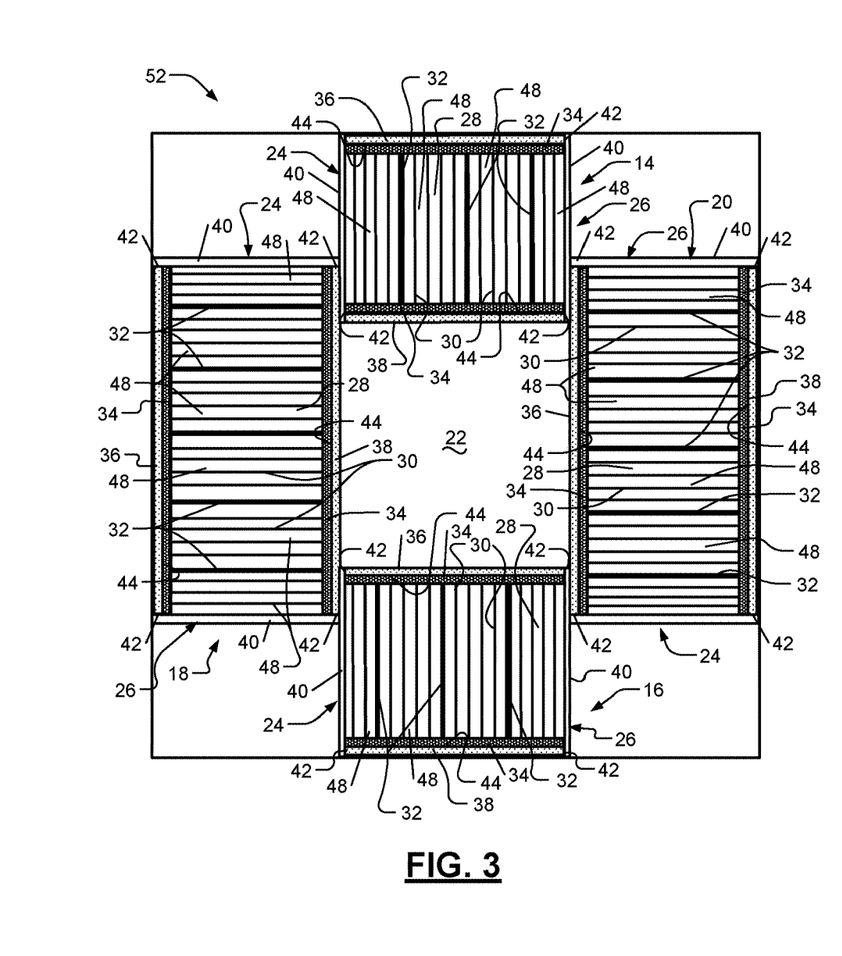
FIG. 3 is a section view of a third example of a vehicle including inflatable insulation panels according to the present disclosure.

Referring now to FIG. 3, a vehicle 52 is shown that is similar or identical to the vehicle 10 except for the number of layers of the reflective film 34 and the connections between the flexible layers 32 and the first and second walls 36 and 38. In FIG. 3, each panel 24 includes two layers of the reflective film 34. Each reflective film 34 is attached to the interior surface 44 of the first or second wall 36 or 38. In addition, the tethers 30 and the flexible layers 32 are directly connected to the reflective film 34 and are thereby indirectly connected to the first and second wall 36 and 38 through the reflective film 34.

Figure 4:
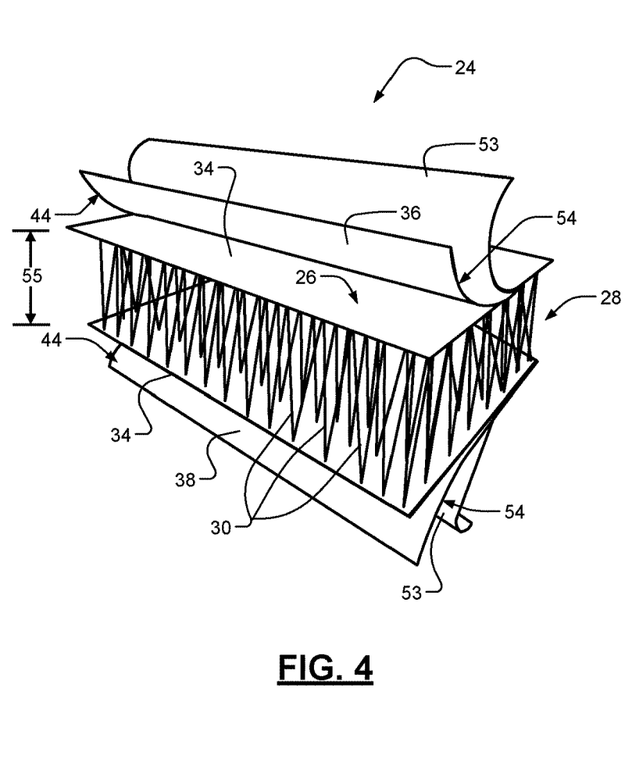
FIG. 4 is an exploded perspective view of an example inflatable inflation panel according to the present disclosure without perimeter walls around an interior cavity of the panel and without flexible layers in the interior cavity.

FIG. 4 shows an example of any one of the panels 24 in the vehicle 52 with its perimeter walls 40 omitted to illustrate components disposed within the cavity 28 of the bladder 26 except for the flexible layers 32, which are also omitted. In the example shown in FIG. 4, the panel 24 includes one or more additional layers 53 attached to exterior surfaces 54 of the first and second walls 34 and 36. The layers 53 may be made from the same material as the bladder 26 or a different material. The first and second walls 36 and 38 are separated by an air gap or distance 55.

Figure 5:
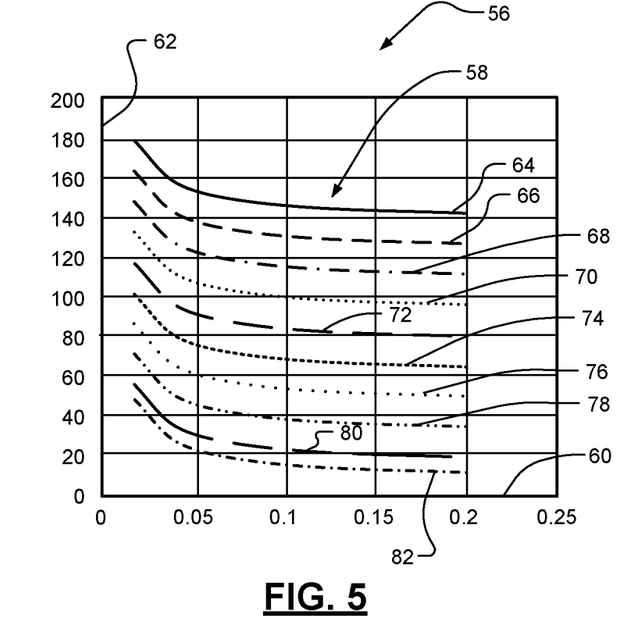
FIGS. 5 and 6 are graphs illustrating heat loss per unit area of inflatable insulation panels according to the present disclosure having different sized air gaps between outer walls of the panels.

Referring now to FIG. 5, a graph 56 illustrates a plurality of curves 58 plotted with respect to an x-axis 60 that represents air gap thickness (i.e., the distance 55) in m and a y-axis 62 that represents heat loss per unit area in watts per meter squared (W/m²). The curves 58 indicate the heat loss per unit area of examples of the panel 24 when the difference between the temperatures of the first and second walls 36 and 38 is 30 degrees Celsius (° C.). The reflective film 34 has a different value of emissivity in each example. The curves 58 include a first curve 64 corresponding to an emissivity of 0.9, a second curve 66 corresponding to an emissivity of 0.8, a third curve 68 corresponding to an emissivity of 0.7, a fourth curve 70 corresponding to an emissivity of 0.6, a fifth curve 72 corresponding to an emissivity of 0.5, a sixth curve 74 corresponding to an emissivity of 0.4, a seventh curve 76 corresponding to an emissivity of 0.3, an eighth curve 78 corresponding to an emissivity of 0.2, a ninth curve 80 corresponding to an emissivity of 0.1, and a tenth curve 82 corresponding to an emissivity of 0.05. As indicated by the tenth curve 82, the panel 24 has a heat loss per unit area of 15.68 W/m² when the difference between the temperatures of the first and second walls 36 and 38 is 30° C., the reflective film 34 has an emissivity of 0.05, and the air gap thickness is 0.1 m. Thus, if the surface area of each of the first and second walls 36 and 38 is 25 meters squared (m²), the panel 24 has a heat loss of 393 watts (W).

Figure 6:
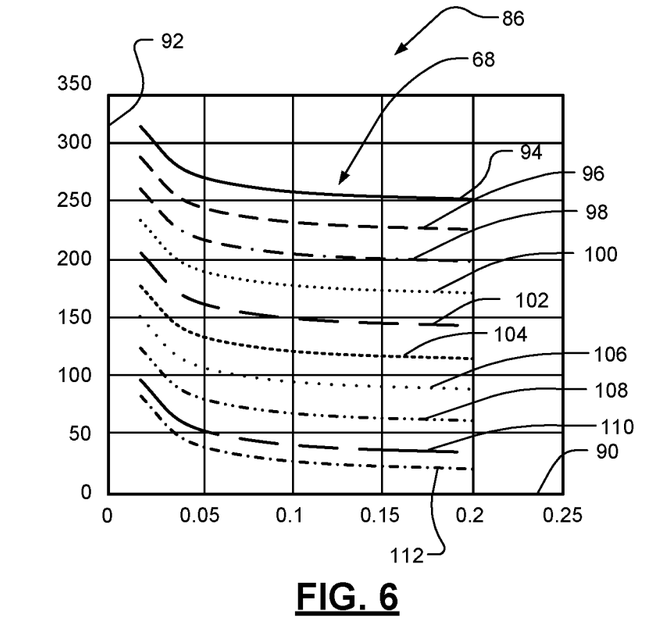

Referring now to FIG. 6, a graph 86 illustrates a plurality of curves 88 plotted with respect to an x-axis 90 that represents air gap thickness in m and a y-axis 92 that represents heat loss per unit area in W/m². The curves 88 indicate the heat loss per unit area of examples of the panel 24 when the difference between the temperatures of the first and second walls 36 and 38 is 50° C. The reflective film 34 has a different value of emissivity in each example. The curves 88 include a first curve 94 corresponding to an emissivity of 0.9, a second curve 96 corresponding to an emissivity of 0.8, a third curve 98 corresponding to an emissivity of 0.7, a fourth curve 100 corresponding to an emissivity of 0.6, a fifth curve 102 corresponding to an emissivity of 0.5, a sixth curve 104 corresponding to an emissivity of 0.4, a seventh curve 106 corresponding to an emissivity of 0.3, an eighth curve 108 corresponding to an emissivity of 0.2, a ninth curve 110 corresponding to an emissivity of 0.1, and a tenth curve 112 corresponding to an emissivity of 0.05. As indicated by the tenth curve 112, the panel 24 has a heat loss per unit area of 26.92 W/m² when the difference between the temperatures of the first and second walls 36 and 38 is 50° C., the reflective film 34 has an emissivity of 0.05, and the air gap thickness is 0.1 m. Thus, if the surface area of each of the first and second walls 36 and 38 is 25 m², the panel 24 has a heat loss of 673 W.

As evidenced by the graphs 56, 86 of FIGS. 5 and 6, the amount of heat loss per unit area of the panel 24 decreases as the emissivity of the reflective film 34 decreases. In addition, the amount of heat loss per unit area of the panel 24 decreases as the air gap thickness increases. Further, the amount by which the heat loss per unit are of the panel 24 decreases diminishes at emissivity values less than 0.05 and at air gap thicknesses greater than 0.1 m.

Figure 7:
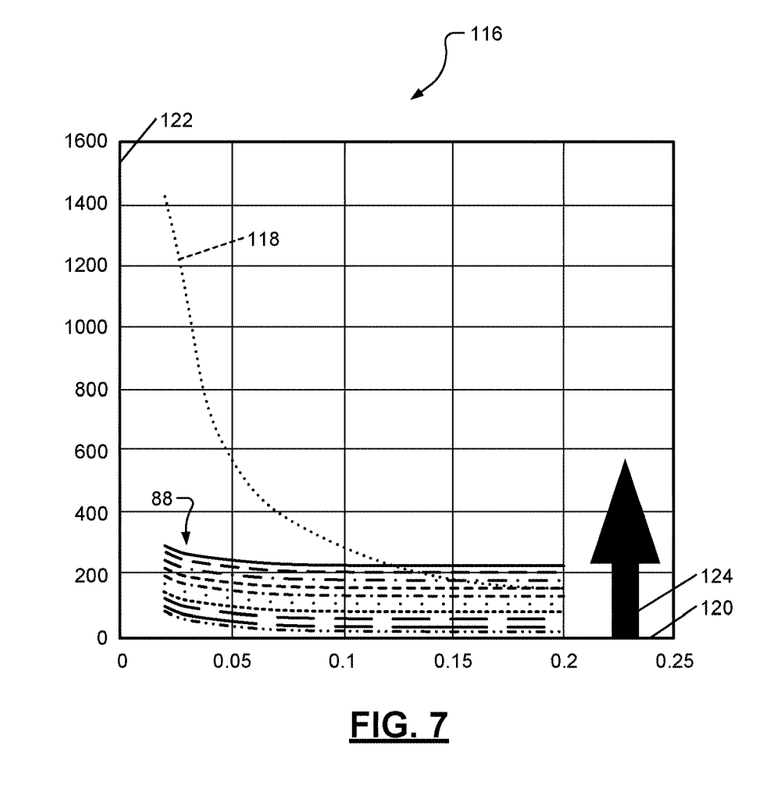
FIGS. 7 through 9 are graphs illustrating heat loss per unit area of inflatable insulation panels according to the present disclosure and heat loss per unit area of insulation panels made from fiber reinforce plastic.

Referring now to FIG. 7, a graph 116 illustrates the curves 88 and an eleventh curve 118 plotted with respect to an x-axis 120 that represents panel thickness in m and a y-axis 122 that represents heat loss per unit area in W/m². The thickness of each panel 24 is the distance 55. The eleventh curve 118 indicates the heat loss per unit area of an insulation panel made from FRP. An arrow 124 indicates increasing emissivity levels of the reflective films 34 in the panels 24 represented by the curves 88.

Figure 8:
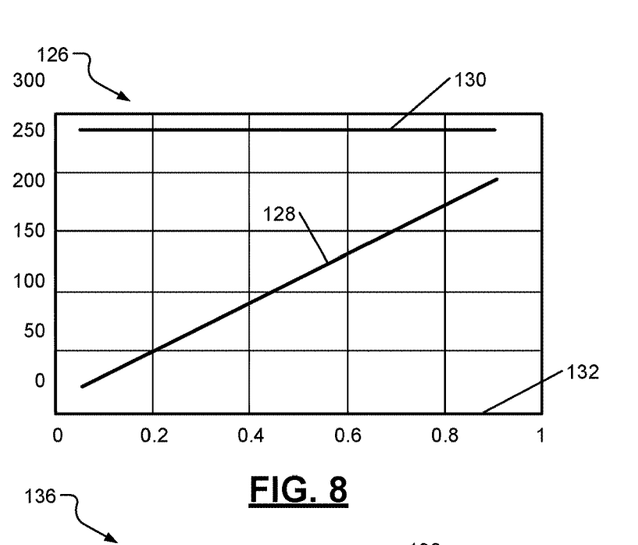

Referring now to FIG. 8, a graph 126 illustrates a first curve 128 and a second curve 130 plotted with respect to an x-axis 132 that represents panel thickness in m and a y-axis 134 that represents heat loss per unit area in W/m². The first curve 128 corresponds to the panel 24 with a panel thickness of 100 mm. Thus, the first curve 128 corresponds to a single point on each of the curves 88 of FIG. 7 aligned with 0.1 on the x-axis 120. The second curve 130 corresponds to the FRP panel with a panel thickness of 100 mm. Thus, the second curve 130 corresponds to a single point on the eleventh curve 118 of FIG. 7 aligned with 0.1 on the x-axis 120.

Figure 9:
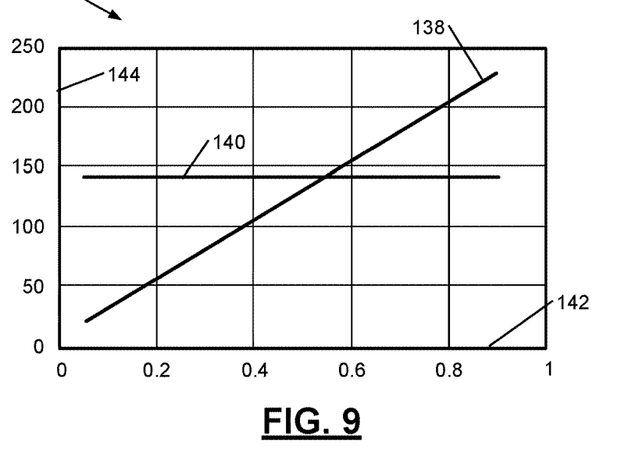

Referring now to FIG. 9, a graph 136 illustrates a first curve 138 and a second curve 140 plotted with respect to an x-axis 142 that represents panel thickness in m and a y-axis 144 that represents heat loss per unit area in W/m². The first curve 138 corresponds to the panel 24 with a panel thickness of 200 mm. Thus, the first curve 138 corresponds to a single point on each of the curves 88 of FIG. 7 aligned with 0.2 on the x-axis 120. The second curve 140 corresponds to the FRP panel with a panel thickness of 200 mm. Thus, the second curve 140 corresponds to a single point on the eleventh curve 118 of FIG. 7 aligned with 0.2 on the x-axis 120.

As evidenced by the graphs 116, 126, and 136, for nearly all of the emissivity values and panel thicknesses represented, the heat loss per unit area of the panel 24 is less than the heat loss per unit area of the FRP panel. The only exceptions to this relative panel performance occur when the reflective film 34 of the panel 24 has an emissivity that is greater than 0.5 and each the panel 24 and the FRP panel has a thickness that is greater than 0.1 m. Thus, the reflective film 34 of each panel 24 may have an emissivity that is less than or equal to 0.5, and each panel 24 may have a thickness that is less than or equal to 0.1 m. The graphs 116, 126, and 136 also show that the panel 24 can have thickness that is less than 0.1 m and still provide the same insulation as, or better insulation than, the FRP panel with a thickness of 0.1 m.

Figure 10:
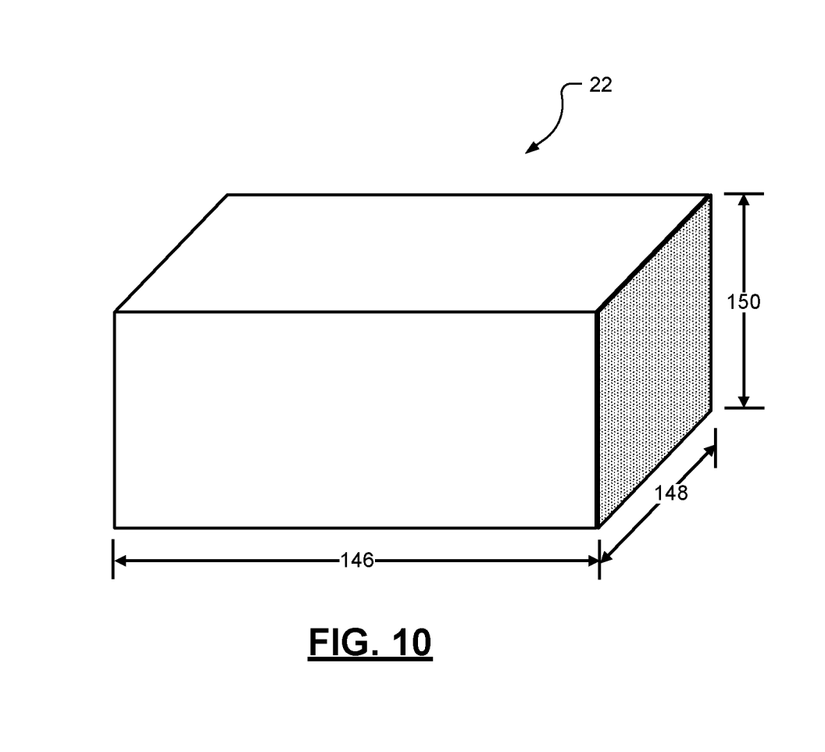
FIG. 10 is a perspective view of the cargo area of any one of the vehicles shown in FIGS. 1 through 4.

Referring now to FIG. 10, the cargo area 22 of the vehicle 10 has a length 146, a width 148, and a height 150. In one example, the length 146 is 3.4 m, the width 148 is 2 m, and the height 150 is 2 m. Thus, in this example, the volume of the cargo area 22 is 11.56 meters cubed ($m^3$). In addition, the preceding example corresponds to a panel thickness of 100 mm.

Figure 11:
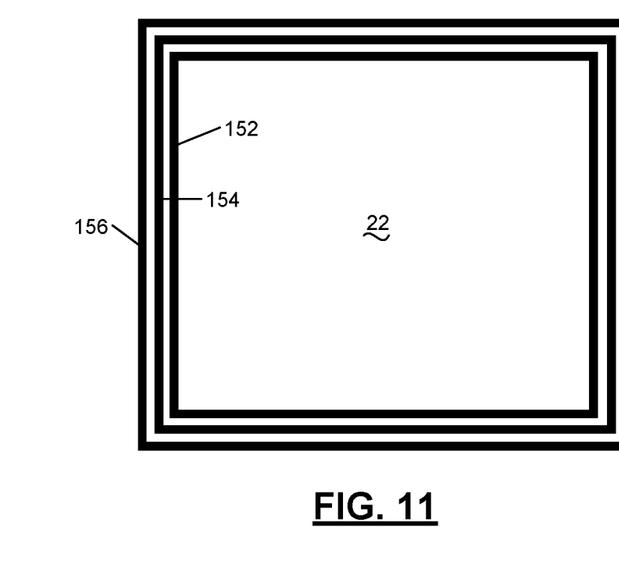
FIG. 11 is a section view of the cargo area of FIG. 10 illustrating changes in the volume of the cargo area as the panels are inflated or deflated.

Referring now to FIG. 11, various examples of the cargo area 22 are shown. A first example 152 of the cargo area 22 is the example described above in which the panel thickness is 100 mm and the volume of the cargo area is 11.56 $m^3$. A second example 154 of the cargo area 22 corresponds to an inflated panel thickness (i.e., the distance 55) of 50 mm. In the second example 154, the length 146 of the cargo area 22 is 3.5 m, the width 148 of the cargo area 22 is 1.8 m, and the height 150 of the cargo area 22 is 2.1 m. Thus, the volume of the cargo area 22 is 13.23 $m^3$, which equates to 14.4% additional cargo space relative to the first example 152. Notably, as shown in FIG. 7, even when the thickness of the panel 24 is 50 mm and the thickness of the FRP panel is 100 mm, the panel 24 allows less heat loss per unit area relative to the FRP panel regardless of the emissivity of the reflective film 134. Thus, the panel 24 may provide better insulation even at a reduced panel thickness that yields additional cargo space.

A third example 156 of the cargo area 22 corresponds to a deflated panel thickness of 10 mm. In the third example 156, the length 146 of the cargo area 22 is 3.58 m, the width 148 of the cargo area 22 is 1.88 m, and the height 150 of the cargo area 22 is 2.18 m. Thus, the volume of the cargo area 22 is 14.67 $m^3$, which equates to 27.0% additional cargo space relative to the first example 152. In other words, deflating the panel 24 may increase the volume of the cargo area 22 by 27.0%.

Figure 12:
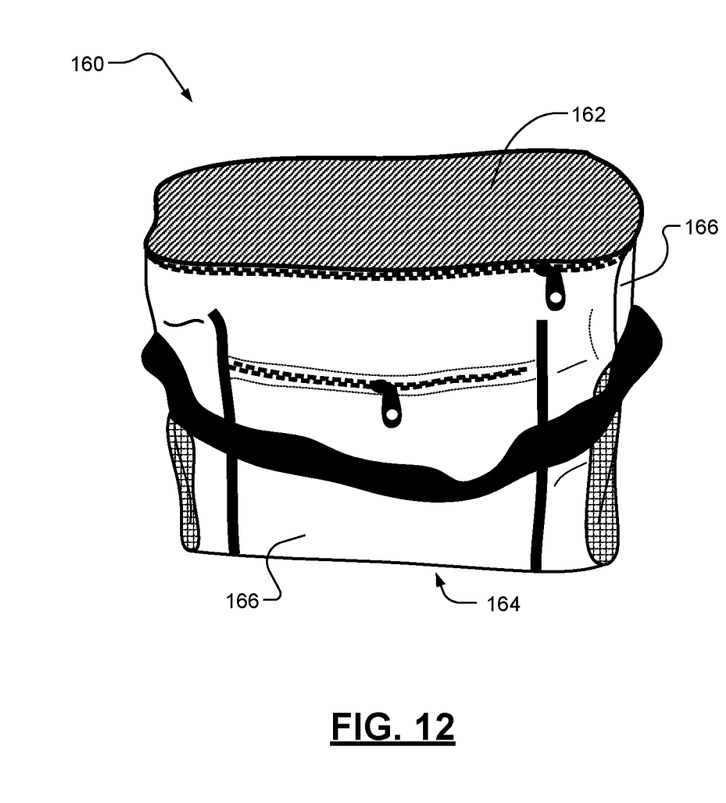
FIGS. 12 and 13 are perspective views of a cooler including inflatable insulation panels according to the present disclosure.
Figure 13:
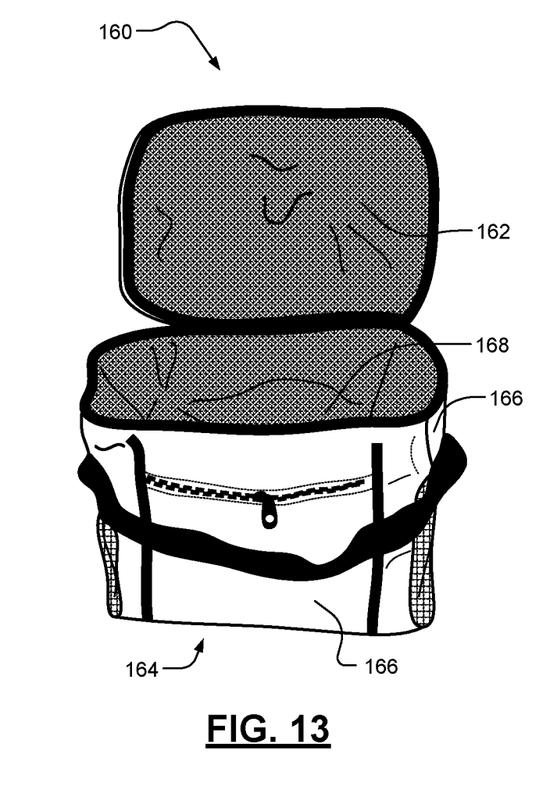

Referring now to FIGS. 12 and 13, a soft cooler 160 includes a lid 162, a bottom wall 164, and sidewalls 166. The lid 162, the bottom wall 164, and the sidewalls 166 collectively define an internal cavity 168 of the cooler 160. Each of the lid 162, the bottom wall 164, and the sidewalls 166 includes an insulation panel according to the present disclosure such as any of the panels 24 shown in FIGS. 1 through 4. The insulation panels may be inflated using a pump (not shown) included in the cooler 160. The insulation panels may be inflated to increase the insulation and rigidity of the cooler 160 and to provide an air cushion that protects items within the cooler 160. The insulation panels may be deflated to increase the volume of the internal cavity 168 and decrease the rigidity of the cooler 160.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.).

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "and/or" includes any and all combinations of one or more of the associated listed items. As used herein, the phrase at least one of A, B, and C should be construed to mean a logical (A OR B OR C), using a non-exclusive logical OR, and should not be construed to mean "at least one of A, at least one of B, and at least one of C."

What is claimed is:
1. An inflatable insulation panel comprising:
 a bladder configured to contain air, the bladder including a first wall, a second wall opposite of the first wall, and perimeter walls extending between and connected to perimeter edges of the first and second walls, the first and second walls and the perimeter walls collectively defining an interior cavity of the bladder;
a plurality of tethers disposed within the interior cavity of the bladder, the plurality of tethers extending between and connected to interior surfaces of the first and second walls, the plurality of tethers limiting movement of the first and second walls away from one another when the bladder is inflated;
at least one reflective film disposed within the interior cavity of the bladder and between the interior surfaces of the first and second walls; and
a plurality of flexible layers disposed within the interior cavity of the bladder, the plurality of flexible layers extending between and connected to the interior surfaces of the first and second walls, the plurality of flexible layers dividing the interior cavity of the bladder into a plurality of cells, and the plurality of flexible layers connected to the at least one reflective film.

2. The inflatable insulation panel of claim 1 wherein the at least one reflective film is attached to at least one of the interior surfaces of the first and second walls.

3. The inflatable insulation panel of claim 2 wherein the at least one reflective film includes a first reflective film attached to the interior surface of the first wall and a second reflective film attached to the interior surface of the second wall.

4. The inflatable insulation panel of claim 1 wherein the at least one reflective film is spaced apart from the interior surfaces of the first and second walls when the bladder inflated.

5. The inflatable insulation panel of claim 1 wherein the at least one reflective film has an emissivity that is less than or equal to 0.5.

6. The inflatable insulation panel of claim 1 wherein the plurality of flexible layers are connected to the at least one reflective film by extending through the at least one reflective film.

7. The inflatable insulation panel of claim 1 wherein the plurality of flexible layers are configured to prevent airflow between the plurality of cells.

8. A cooler comprising:
a bottom wall;
a top wall; and
sidewalls extending between and connected to perimeter edges of the top and bottom walls, wherein at least one of the bottom wall, the top wall, and the sidewalls is at least partially formed by the inflatable insulation panel of claim 1.

9. An inflatable insulation panel comprising:
a bladder configured to contain air, the bladder including a first wall, a second wall opposite of the first wall, and perimeter walls extending between and connected to perimeter edges of the first and second walls, the first and second walls and the perimeter walls collectively defining an interior cavity of the bladder;
a plurality of tethers disposed within the interior cavity of the bladder, the plurality of tethers extending between and connected to interior surfaces of the first and second walls, the plurality of tethers limiting movement of the first and second walls away from one another when the bladder is inflated; and
a plurality of flexible layers disposed within the interior cavity of the bladder, the plurality of flexible layers extending between and connected to the interior surfaces of the first and second walls, the plurality of flexible layers dividing the interior cavity of the bladder into a plurality of cells, the plurality of flexible layers configured to prevent airflow between the plurality of cells.

10. The inflatable insulation panel of claim 9 wherein the plurality of flexible layers extend between and are connected to interior surfaces of two of the perimeter walls that oppose one another.

11. The inflatable insulation panel of claim 9 wherein the first and second walls are spaced apart from one another by a distance that is greater than or equal to 0.02 meters when the bladder is inflated.

12. The inflatable insulation panel of claim 9 further comprising at least one reflective film disposed within the interior cavity of the bladder and between the interior surfaces of the first and second walls.

13. The inflatable insulation panel of claim 12 wherein the at least one reflective film is attached to at least one of the interior surfaces of the first and second walls.

14. The inflatable insulation panel of claim 13 wherein the at least one reflective film includes a first reflective film attached to the interior surface of the first wall and a second reflective film attached to the interior surface of the second wall.

15. The inflatable insulation panel of claim 12 wherein the at least one reflective film is spaced apart from the interior surfaces of the first and second walls when the bladder is inflated.

16. The inflatable insulation panel of claim 12 wherein the at least one reflective film has an emissivity that is less than or equal to 0.5.

17. An inflatable insulation panel comprising:
a bladder configured to contain air, the bladder including a first wall, a second wall opposite of the first wall, and perimeter walls extending between and connected to perimeter edges of the first and second walls, the first and second walls and the perimeter walls collectively defining an interior cavity of the bladder;
a plurality of tethers disposed within the interior cavity of the bladder, the plurality of tethers extending between and connected to interior surfaces of the first and second walls, the plurality of tethers limiting movement of the first and second walls away from one another when the bladder is inflated;
at least one reflective film disposed within the interior cavity of the bladder and between the interior surfaces of the first and second walls; and
a plurality of flexible layers disposed within the interior cavity of the bladder, the plurality of flexible layers extending between and connected to the interior surfaces of the first and second walls, the plurality of flexible layers dividing the interior cavity of the bladder into a plurality of cells, the plurality of flexible layers extending through the at least one reflective film and are connected to the interior surfaces of the first and second walls.

18. The inflatable insulation panel of claim 17 wherein the at least one reflective film is attached to at least one of the interior surfaces of the first and second walls.

19. The inflatable insulation panel of claim 17 wherein the at least one reflective film is spaced apart from the interior surfaces of the first and second walls when the bladder is inflated.

20. The inflatable insulation panel of claim 17 wherein the plurality of flexible layers are configured to prevent airflow between the plurality of cells.

* * * * *